United States Patent [19]

Hayes

[11] 4,015,631
[45] Apr. 5, 1977

[54] GAS TAPS
[75] Inventor: Stephen Hayes, Dudley, England
[73] Assignee: Ewarts Limited, Dudley, England
[22] Filed: Mar. 7, 1975
[21] Appl. No.: 556,451
[52] U.S. Cl. .................. 137/625.33; 251/DIG. 1; 251/122; 251/205; 251/252
[51] Int. Cl.² ................. F16K 1/12; F16K 1/34
[58] Field of Search ........ 251/210, 117, 122, 118, 251/252, 325, 205, DIG. 1; 137/625.28, 625.38, 625.33

[56] References Cited
UNITED STATES PATENTS

| 1,891,533 | 12/1932 | Gish | 251/252 |
|---|---|---|---|
| 3,512,550 | 5/1970 | Ammann | 251/122 X |
| 3,578,285 | 5/1971 | Carlton | 251/325 X |
| 3,601,358 | 8/1971 | Cruse | 251/118 X |
| 3,648,968 | 3/1972 | Reid et al. | 251/122 X |

FOREIGN PATENTS OR APPLICATIONS

| 148,576 | 10/1931 | Switzerland | 137/625.3 |
|---|---|---|---|
| 883,539 | 11/1961 | United Kingdom | 251/210 |

Primary Examiner—Arnold Rosenthal
Attorney, Agent, or Firm—Marshall & Yeasting

[57] ABSTRACT

The invention provides a gas tap particularly intended to be made of aluminium, using an axially movable plunger to control flow, in which the tip of the plunger is modified for low rate flow control, by providing a low rate flow passage in the tip of the plunger.

11 Claims, 2 Drawing Figures

GAS TAPS

BACKGROUND OF THE INVENTION

This invention relates to gas taps.

Conventional gas taps have comprised a brass or similar metal body provided with a tapered bore in which a similarly shaped plug, also of brass or like metal, has been rotatable, to bring radial ports in the body and plug into register, or take them out of register, to control the flow of gas through the tap. Leakage of gas from the ports along the length of the plug can be avoided because these metals can be given a high degree of finish, and the complementary tapering of plug and bore enable them to be moved relative to one another axially to take up tolerances.

However, brass and similar metals have been increasing in price considerably in recent years, and there is interest in providing a gas tap made from other metals, It is found that when for example aluminium or an alloy thereof is used it is much more difficult to provide satisfactory surface finish and the conventional tapered plug design is impractical to manufacture. Attention has therefore been directed towards the use of cylindrical plungers moved axially in cylindrical bores when "O" rings can be employed to control leakage, and the principal difficulty then is to provide means for fine adjustment of the rate of flow, and hence of the axial position of the plunger without requiring great delicacy of touch in some means for providing the axial displacement.

SUMMARY OF THE INVENTION

The objects of the present invention are to provide solutions to these problems.

In accordance with the invention, a gas tap comprises a plunger which is movable axially in a body bore to control the rate of flow through the tap, a tapered nose on the plunger being co-operable with a flow passage in the tap body, an 0 ring sealing the plunger to the body bore to provide a final closing seal in an "off" position of the tap, and said nose being adapted to provide a finely controlled low flow rate.

In one possibility the tapered nose has a groove which extends axially from the tip of the nose and to the full diameter portion of the nose, and located wholly between the said tip and the O ring, so that as the plunger is moved towards the "off" position, flow reduction is caused as the tapered tip enters the complementary dimension flow passage in the tap body, and after the full diameter portion of the nose has entered that passage, flow can take place through the groove. When the O ring enters the passage flow ceases and the passage is sealed in this "off" position.

Preferably however a pair of O rings is provided and a low flow rate passage is formed by an axially extending bore or bleed passage opening from the tip of the nose through the plunger and communicating with at least one radially extending bore opening between the two O rings. By these means, the flow rate is reduced as the tapered nose enters the complementary bore portion, and is reduced still further when the first O ring enters that passage, but continues at the fixed low rate determined by the bleed passage dimensions until the second O ring enters the passage to provide the closed or "off" position of the tap.

The plunger may be moved axially by any convenient means including for example a cam which is angularly turned to provide the displacement, and in this event the cam may be shaped so that the angular movement required for a given axial displacement of the plunger varies at different points in the said angular movement so as to give particularly sensitive control over at least a portion of the movement.

In accordance with a second aspect of the invention, a gas tap of the kind referred to has the plunger coupled by a pin and slot to a rotatable stem, whereby rotation of the stem is translated into axial movement of the plunger, the disposition of the slots controlling the extent of axial movement of the plunger for a given angular movement of the stem.

DESCRIPTION OF THE PREFERRED EMBODIMENT

Figure 1:
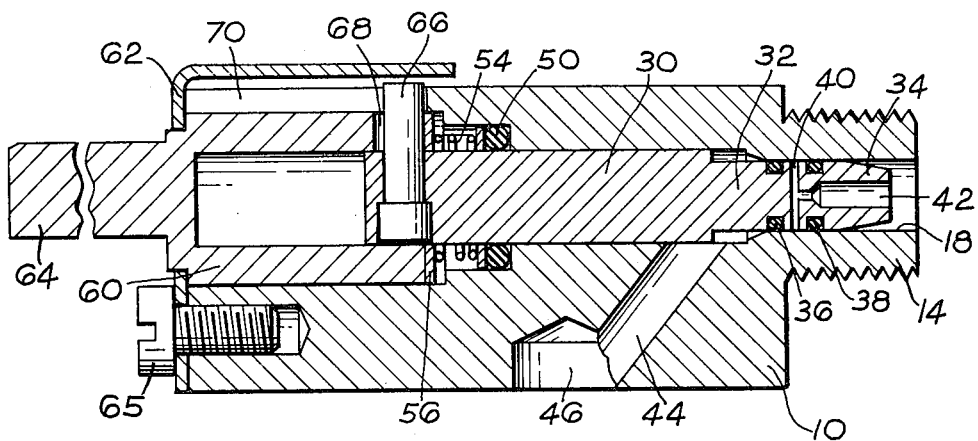
FIG. 1 is a sectional side elevation of a tap.

Referring now to the drawings, the tap body 10 comprises a length of light alloy extrusion which is made of suitable cross-section to provide both the tap body per se, and also a pair of mounting flanges 12. It will be understood that a suitable length of the extrusion is taken and machined to reduce the side flanges to the required length and also to provide a male screw-threaded connection 14 at one end of the body for the outlet of gas. An internally and female screw-threaded connection may be provided as an obvious alternative.

The extrusion is bored internally to provide a main body chamber 16 and a smaller diameter outlet 18 connected by a tapering portion 20 and shoulder 22. The body is also bored from the opposite end to provide three stepped and successively larger diameter portions 24, 26, 28.

Mounted in the body is a plunger, best seen in FIG. 1 which comprises a main portion 30 which is a close sliding fit in the body bore 16, and a nose portion 32 which is dimensioned to be a close sliding fit in the outlet passage 18. The portion 32 includes a tapered nose 34 and is grooved to carry a pair of O rings 36, 38. Between the O rings is a system of radial bores 40 communicating with an axial bore 42 opening through the tip of the nose.

The body of the tap is provided with a second flow passage 44 opening to a connection point 46 at the external face of the body and to the bore portion 16 towards the outlet passage 18.

The construction as thus far described operates by axial movement of the plunger 30 causing the nose 34 to enter the passage 18 to reduce the flow of gas, for example from inlet 46 to outlet 18 about the plunger, and as the nose extends further into the passage 18 the reduction continues. When O ring 38 enters the passage 18 flow about the nose ceases but continues at a low and predetermined rate through the system of bores 40 42 until the second O ring 36 enters the passage 18 to seal flow between the inlet and outlet.

Leakage of gas between the plunger body 30 and the bore 16 is prevented by a further O ring 50 trapped in the bore portion 26 and engaging the plunger body, the "O" ring being held in place by a system of washers and springs 52, 54, 56, the latter abutting the end face of a socket 60 which is held axially captive in the body bore 28 by a cap 62, held in place for example by a screw 65.

Figure 2:
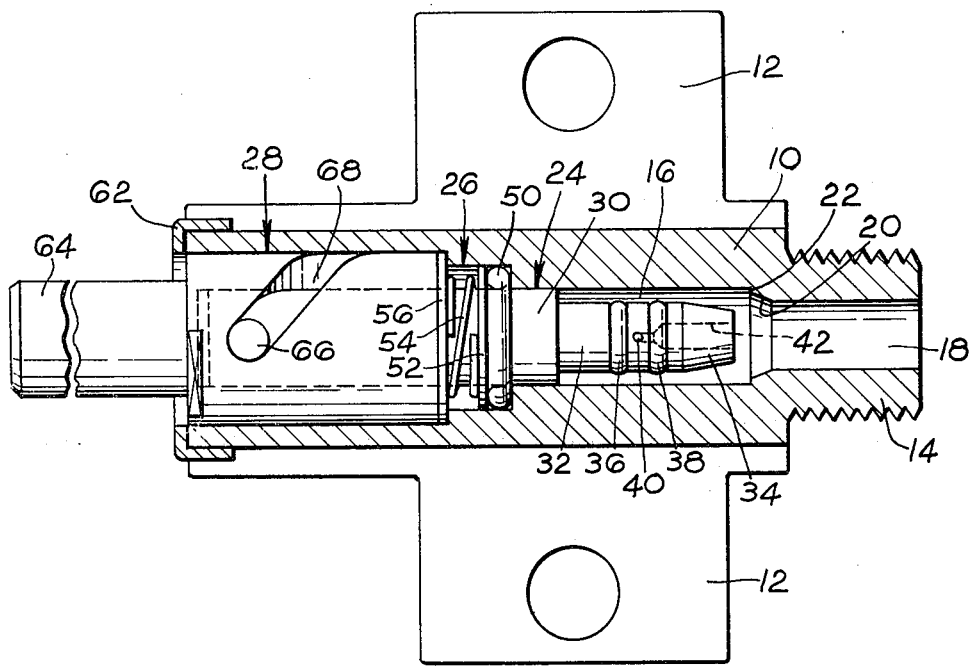
FIG. 2 is a part sectional plan view of the same.

The socket 60 forms part of a plunger movement mechanism and is made integral with stem 64 which may carry an operating knob. The socket bore houses the plunger part 30, in any of the possible axial positions of the same, and the socket and plunger are connected together by a pin and slot mechanism comprising pin 66 projecting transversely of the plunger, extending through an arcuate or for example part helical slot 68 (FIG. 2) in the socket wall, and then through an axially extending and straight slot 70 (FIG. 1) in the tap body. The effect of the slots is to constrain the pin for bodily movement back and forth along the line of the slot 70, and so that rotary movement applied to the stem 64 causes the pin 66 to move along the length of the helical or like arcuate slot 68 in the socket. Consequently the socket rotates relative to the plunger, the plunger is held against rotation, the socket is held against axial movement, and the plunger moves axially, when the control knob or like is turned.

The relationship between angle of movement of the control knob, i.e. the degree of rotation of the stem 64 and the extent of axial displacement of the plunger 30 depends solely upon the shape and arrangement of the slot 68, and this may be selected so as to give rapid or slow axial movement of the plunger at different positions.

It will be appreciated that the slot 70 need not extend in a straight line, but could also have a degree of helix angle or inclination, to modify the control movement of the plunger resulting from knob rotation.

I claim:

1. A gas tap comprising a body provided with a flow passage including successive sections of differing diameter, a plunger which has a tapered nose portion and is mounted for axial movement along said flow passage to control the flow rate of gas through said passage, and an O-ring carried by the plunger and encircling the same at a position adjacent the tapered nose portion, the plunger being movable, from a closed position in which the tapered nose portion is received within the smaller diameter section of the flow passage and the O-ring is located wholly within and sealingly engages the wall of said smaller diameter section, to an open position in which the nose portion extends into the smaller diameter section and the O-ring is located within the larger diameter section, the plunger being provided with a formation extending from the tip of said nose portion towards the O-ring, which formation affords communication between said successive flow passage sections when the plunger is in said open position, and is constituted by a passageway formed in the plunger, said passageway opening at the tip of said nose portion and also at a point on the periphery of the plunger between the O-ring and the tip of the nose portion.

2. A gas tap according to claim 1 in which said plunger is further movable beyond said open position to a fully open position in which the tapered nose portion, and hence the O-ring, is withdrawn from the smaller diameter section into the larger diameter section.

3. A gas tap according to claim 1 in which said internal passageway comprises a first bore extending in the direction of movement of the plunger and a second bore extending perpendicularly to the first bore.

4. A gas tap according to claim 13 in which said plunger is further movable beyond said open position to a fully open position in which the tapered nose portion, and hence the O-ring, is withdrawn from the smaller diameter section into the larger diameter section.

5. A gas tap according to claim 1 in which the O-ring is provided on a cylindrical portion of the plunger and in which said passageway opens at the periphery of said cylindrical portion at a position between the tapered nose portion and the O-ring.

6. A gas tap according to claim 5 in which said plunger is further movable beyond said open position to a fully open position in which the tapered nose portion, and hence the O-ring, is withdrawn from the smaller diameter section into the larger diameter section.

7. A gas tap according to claim 2 including a further O-ring carried by the plunger and encircling the same at a position between the first mentioned O-ring and the tapered nose portion, said internal passageway opening at a point on the periphery of the plunger between the two O-rings.

8. A gas tap as claimed in claim 2 in which said flow passage forms part of a bore formed in said body and in which another O-ring is provided to seal the plunger to the body bore at the end thereof remote from said flow passage.

9. A gas tap as claimed in claim 2 in which the plunger is coupled by a pin and slot to a rotatable stem, whereby rotation of the stem is translated into the aforesaid axial movement of the plunger, the disposition of the slot controlling the extent of such axial movement of the plunger for a given angular movement of the stem.

10. A gas tap as claimed in claim 9 in which the plunger is provided with the pin and the stem is provided with the slot, the slot extending helically about a part of the plunger remote from said nose portion.

11. A gas tap comprising a plunger which is movable axially in a body bore to control the rate of flow through the tap, a tapered nose on the plunger which is co-operable with a flow passage in the tap body, an O ring sealing the plunger to the body bore to provide a final closing seal in an "off" position of the tap, said nose being adapted to provide a finely controlled low flow rate, a pair of O rings which seal the plunger to said flow passage, and a low rate flow passage extending through the said nose from the tip thereof and opening between the said two O-rings.

* * * * *